June 14, 1927.

T. J. KEHOE ET AL 1,631,968

DISHWASHING MACHINE

Filed Dec. 19, 1923      2 Sheets-Sheet 2

Patented June 14, 1927.

1,631,968

UNITED STATES PATENT OFFICE.

THOMAS J. KEHOE, OF TOLEDO, AND MICHAEL J. KEHOE, OF LONDON, OHIO, ASSIGNORS, BY MESNE ASSIGNMENTS, TO CASCADE MANUFACTURING COMPANY.

DISHWASHING MACHINE.

Application filed December 19, 1923. Serial No. 681,542.

This invention relates to improvements in dish washing machines; it particularly relating to that type of machine in which there is employed a revoluble water container.

The object of our invention is to produce a dish washing machine for domestic use which will be simple and economical in construction and effective in operation.

Figure 1:
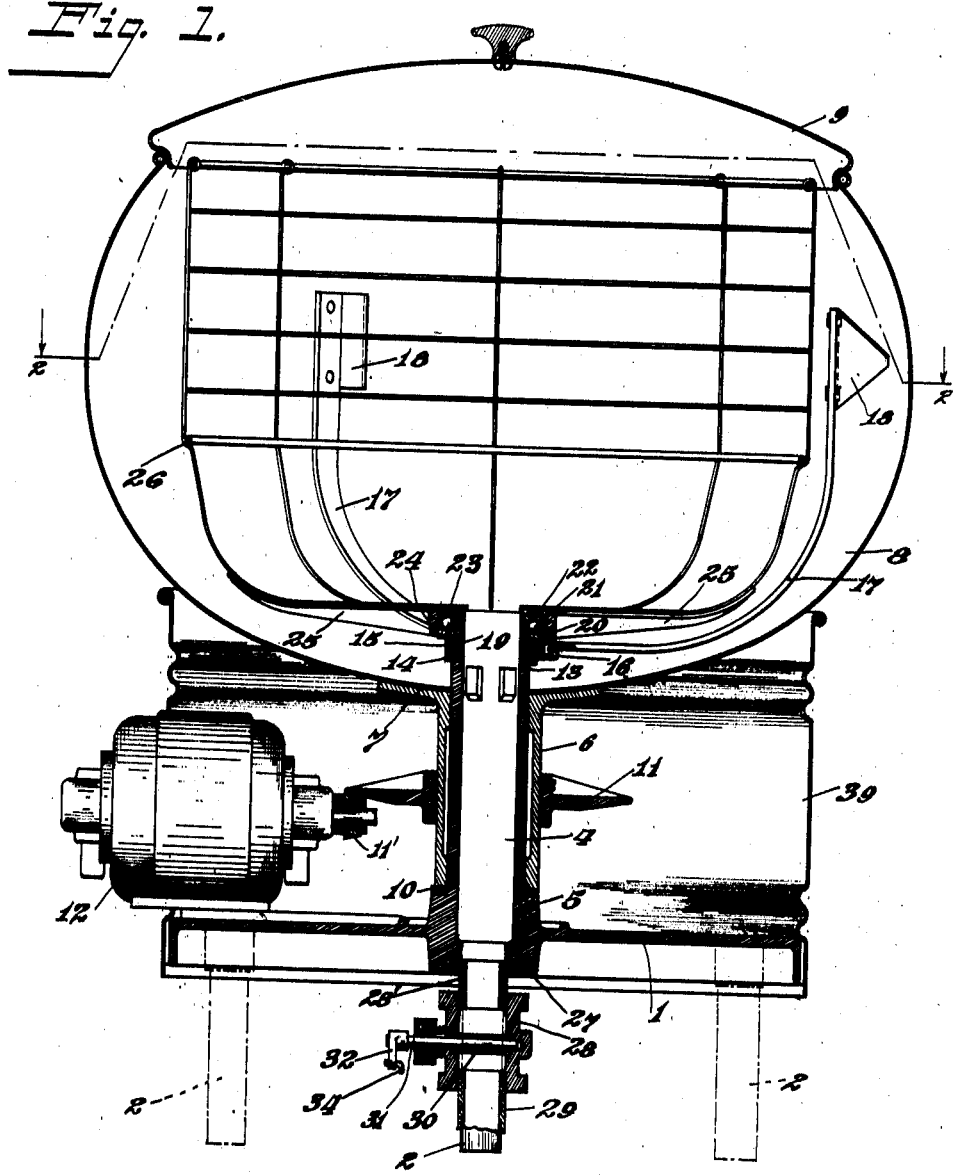
Fig. 1 is a vertical section of a machine embodying the improvements, the section being on the line 1—1 of Fig. 2.
Figure 2:
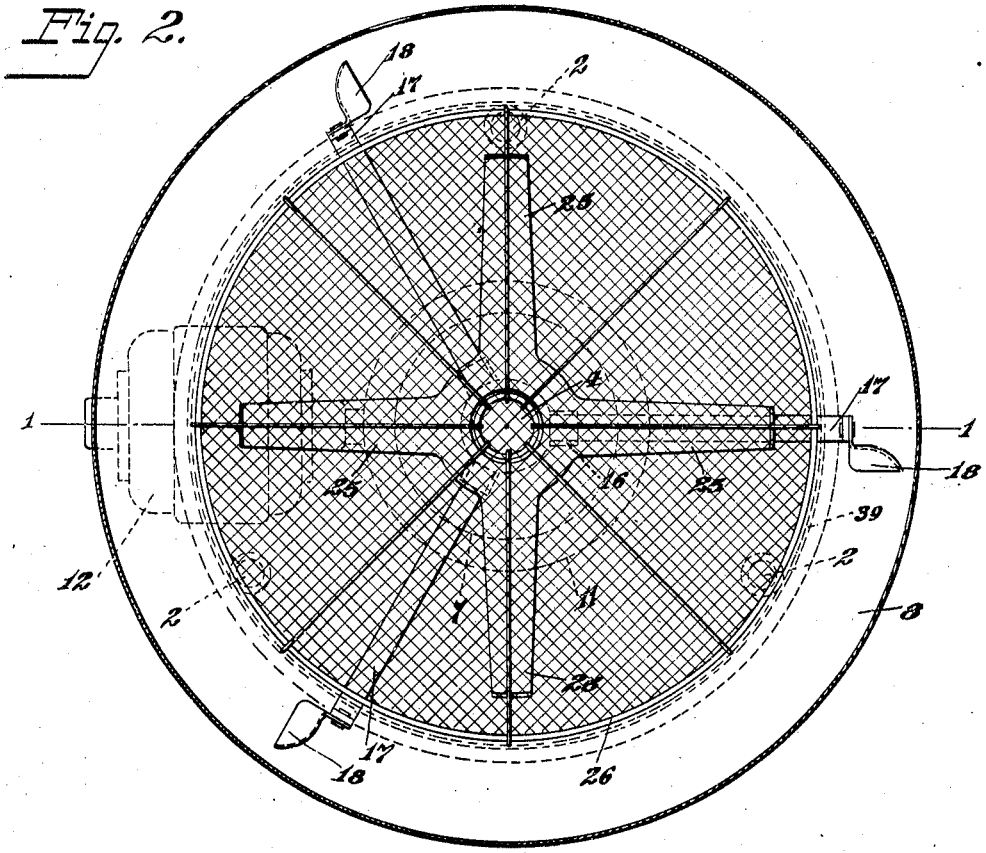
Fig. 2 is a transverse section on the line 2—2 of Fig. 1.
Figure 3:
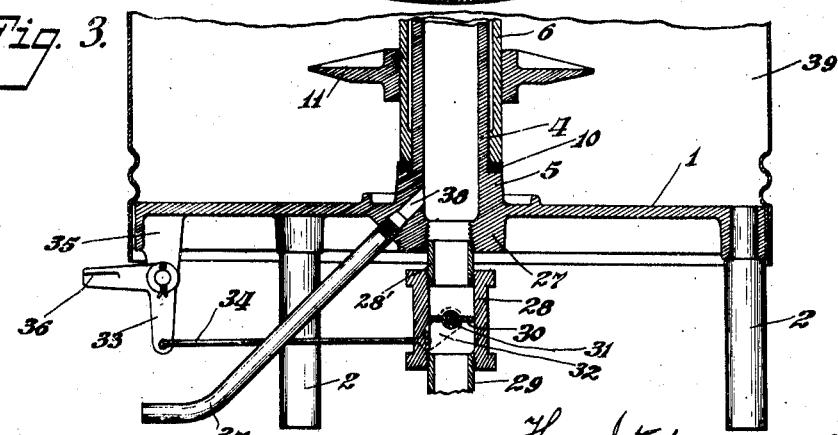
Fig. 3 is a vertical section of a portion of the machine, the section being at right angles to that taken in Fig. 1.

Referring to the drawings, 1 represents a supporting table provided with legs 2 and a centrally-arranged upwardly extending hollow spindle 4 preferably formed integrally therewith. Mounted upon the spindle with its lower end seated upon a shoulder 5 of the spindle, is a sleeve 6 having at its upper end a circular flange 7 to which is secured a spun bowl 8 provided with a cover 9; a thrust collar 10 being inserted between the lower end of the sleeve 6 and the shoulder 5.

Secured to the sleeve 6 is a friction disk 11 driven by a friction pinion 11' on the shaft of an electric motor 12 which is suitably supported on the table 1. Mounted on another shoulder 13 near the upper end of the spindle and pinned to the stem by a pin 14 is a ring 15 which has three equally-spaced ears 16 to each of which is secured a curved arm 17 which terminates at a point somewhat above the vertical center of the bowl 8 and near its inner wall. Each of these arms 17 has secured thereto a blade 18 which has its forward face, considering the direction of rotation of the bowl, of a pocketed form.

Mounted on a third shoulder 19 of the spindle is the lower race ring 20 of a ball bearing, 21 indicating the balls and 22 the upper race ring. Mounted upon the upper race ring 22 is the horizontal portion 23 of a ring angular in cross-section whose vertical portion 24 encloses the ball bearings. This ring has a series of four radially-extending arms 25 to form a spider-like structure to support an open basket 26 of wire of any suitable construction to receive the dishes.

The under side of the table has a hollow interiorly threaded boss 27 in line with the spindle 4. A valve cage 28 is connected with this boss 27 by a pipe 28' having a threaded connection with the boss and cage and the cage also has connected with its opposite end a drain pipe 29. This cage contains a butterfly valve 30, the shaft 31 of which has a crank arm 32 which is connected with one arm of a bell crank lever 33 by a link 34. The lever is pivotally connected with a bracket 35 extending from the under side of the table 1, and the other arm 36 thereof forms a pedal by which the butterfly valve may be opened and closed by the foot of the operator, being held closed by any suitable means.

A water supply pipe 37 is connected to the under side of the table 1 and communicates with a passageway 38 which leads to the interior of the spindle 4; this pipe having a suitable control valve (not shown) by which the water may be supplied to the apparatus when desired.

In operation, the dishes are placed in the basket which is set upon the arms 25 of the spider-like support and the lid 9 replaced to close the top of the bowl. The motor being started, rotary motion is imparted to the bowl which causes the water in the bowl to rise about the interior walls of the bowl by centrifugal force. Rotary movement is imparted to the water, which striking the blades 18 is projected inwardly into the basket. The action of the water upon the dishes imparts a slow rotary movement to the basket which causes the dishes to pass slowly before the streams of water which are projected from the blades 18 thereby causing the water to have a uniform action upon all of the dishes. To drain the dirty water from the bowl the operator presses upon the pedal 36 and opens the butterfly valve 30 until the bowl is drained after which the valve may be closed and the bowl supplied with fresh water for rinsing purposes if desired.

That portion of the apparatus between the table and the lower portion of the bowl is preferably enclosed by a metallic casing 39, this casing having an opening to accommodate the motor 12.

By this arrangement it will be seen that a very simple dish washing apparatus is provided, the bowl, water deflecting members and dish basket being all mounted upon a single supporting stem forming an integral part of the table 1, the bowl being conveniently driven by friction from an electric motor also mounted upon the table. The construction is not only simple and economical in manufacture but also of compact form which may be readily installed in the kitchen of a home for domestic purposes.

Having thus described our invention, we claim:

1. In a washing machine, a tank, means to rotate the tank about a vertical axis, an article holder within the tank, a deflector between the side of the tank and the holder, and a support for the deflector with relation to which support the tank and article holder are movable.

2. In a washing machine, a tank rotatable about a vertical axis, an article holder rotatable within the tank, and a stationary deflector between the side of the tank and the holder.

3. In a washing machine, a tank rotatable about a vertical axis, an article holder in the tank, a deflector between the side of the tank and the holder, a support for the deflector, holding the deflector against rotation at the speed of the tank and relatively rotatable mountings for said support and holder.

4. In a washing machine, a tank having bulging side walls, means to rotate the tank about a vertical axis, a rotatable article holder in the tank, and a stationary deflector outside of the holder and inside of the bulge of the tank wall.

5. In a washing machine, a tank having a bowl-shaped bottom, means to rotate the tank about a vertical axis, a rotatable article holder within the tank, and a stationary deflector between the side of the tank and the holder.

6. In a dish washing machine, a support having a vertically-extending spindle, a water container rotatably mounted on said spindle, a motor for rotating the container, and a dish basket rotatably mounted upon said spindle within said water container and deflectors mounted between the basket and the side of the container and adapted to deflect water from the wall of the container and direct it against dishes in the basket at such an angle as to cause the basket to rotate.

7. In a dish washing machine, a support having a vertical spindle, a water container rotatably mounted on said spindle together with a motor for rotating the same, a dish basket rotatably mounted on the spindle, and a plurality of stationary devices located between said basket and container arranged to intercept the water and project it into the basket at such an angle as to cause the basket to rotate.

In testimony whereof, we have hereunto set our hands this 16th day of November, 1923.

THOMAS J. KEHOE.
MICHAEL J. KEHOE.